United States Patent Office 3,572,396
Patented Mar. 23, 1971

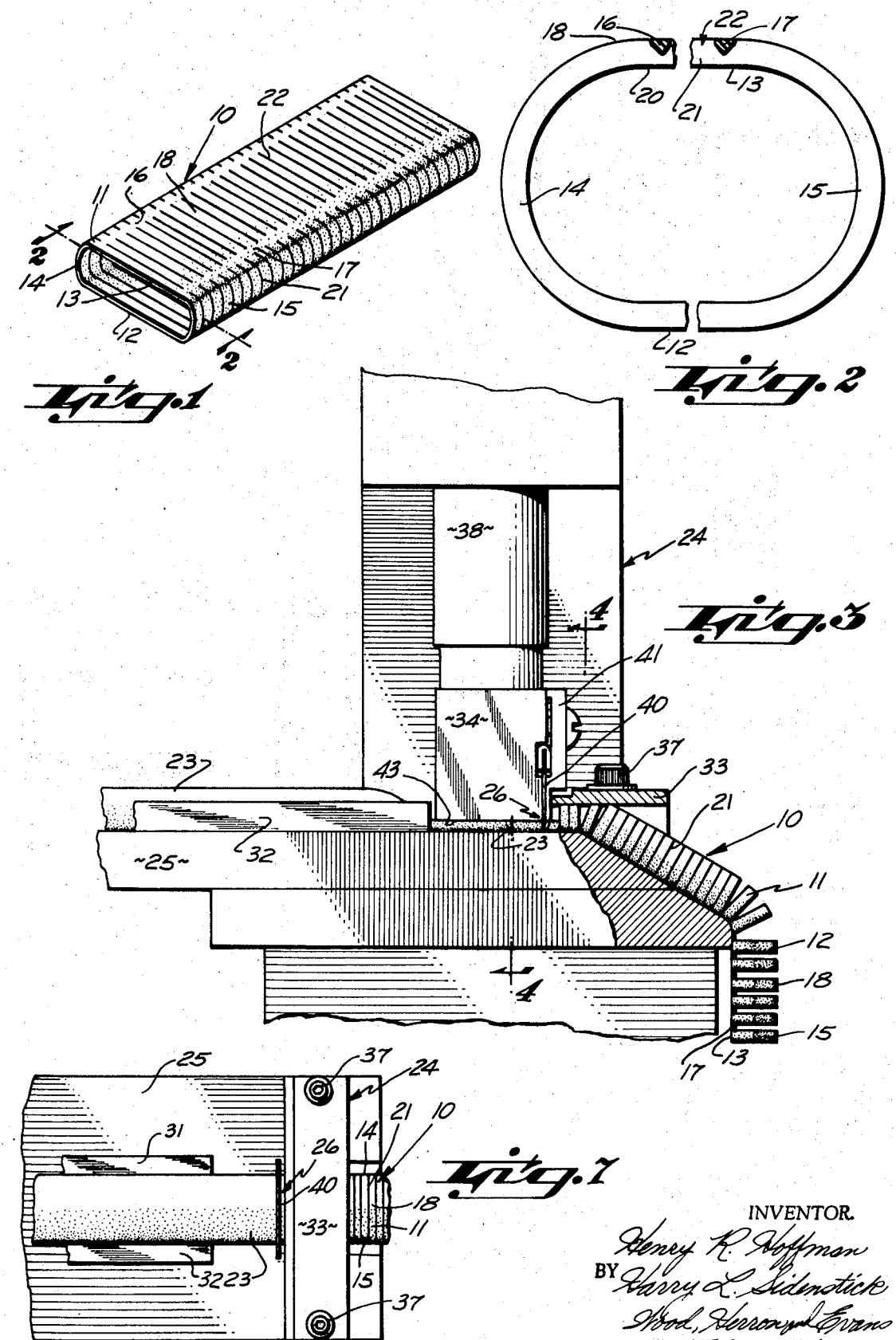

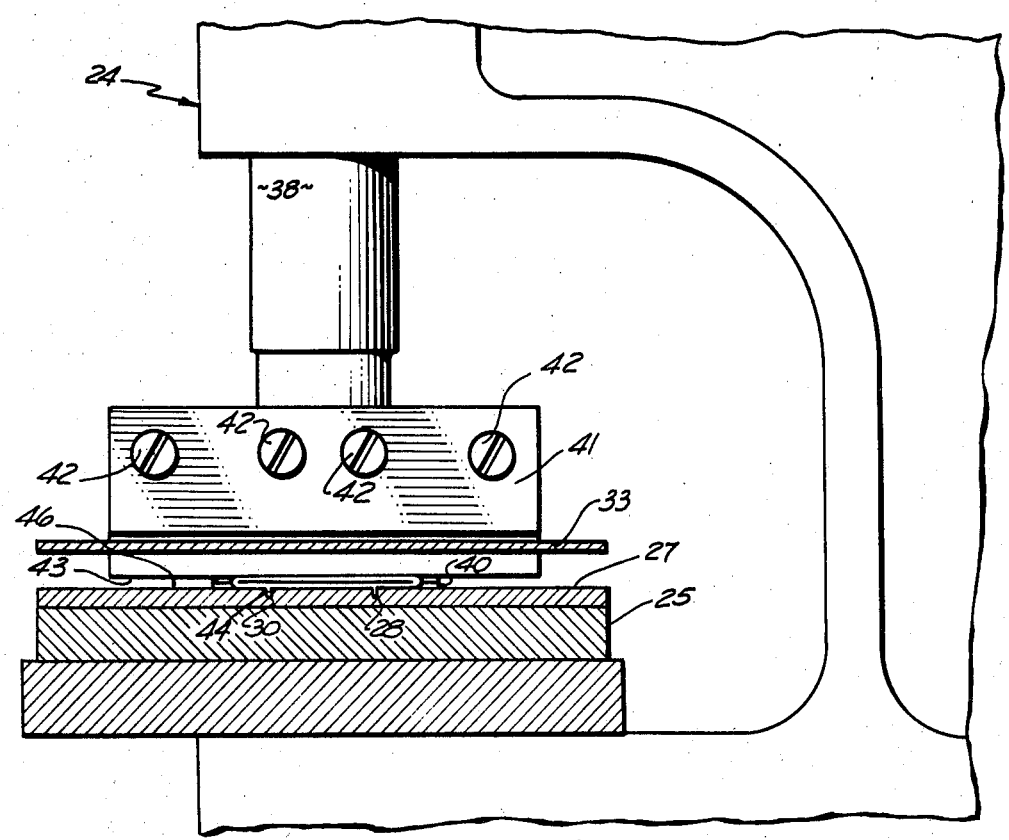
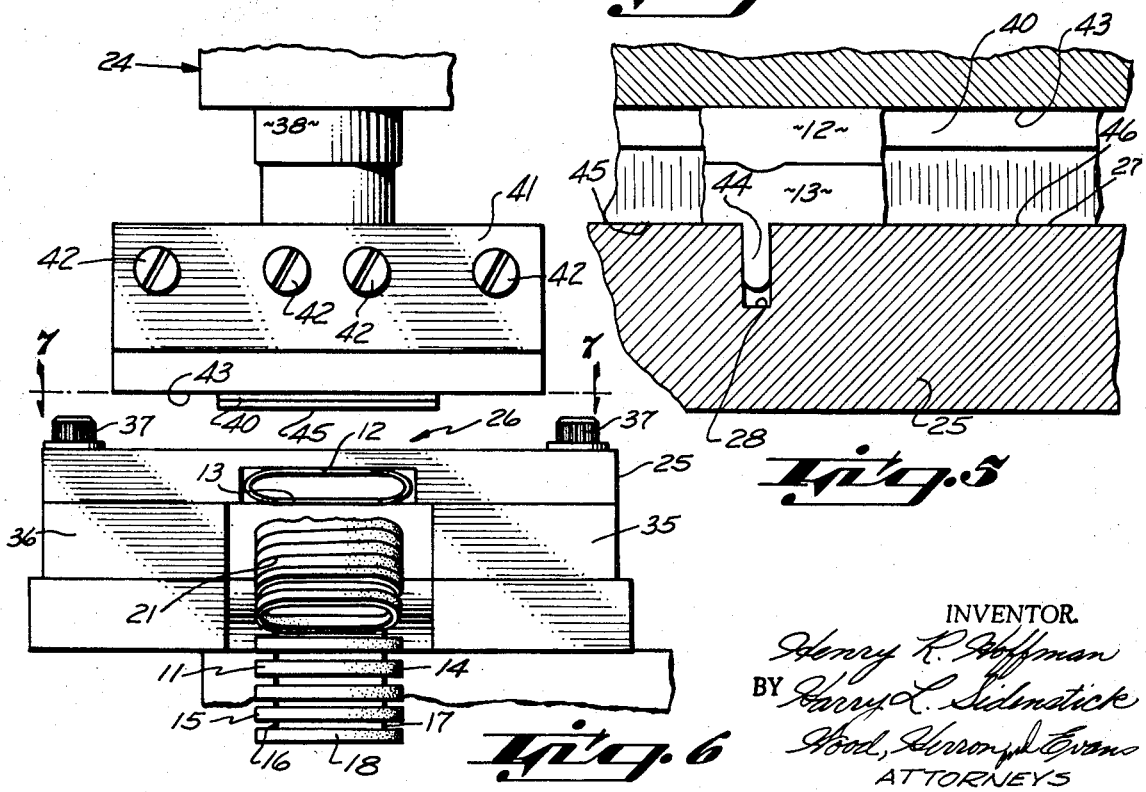

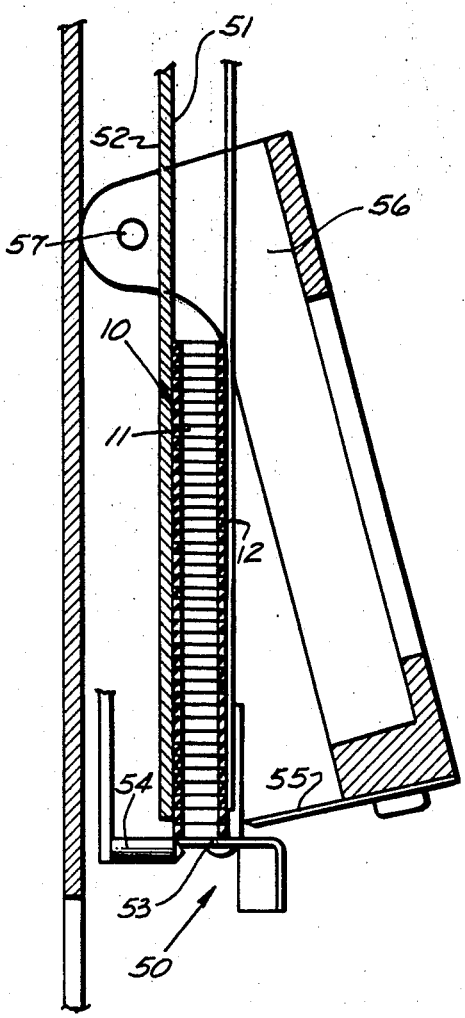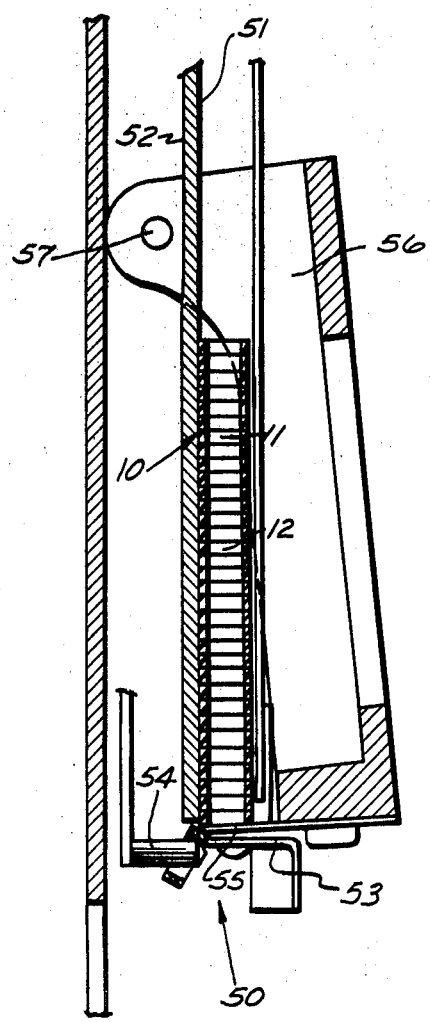

3,572,396
RUBBER BAND STACK AND METHOD AND
APPARATUS FOR ITS MANUFACTURE
Henry R. Hoffman and Harry L. Sidenstick, Cincinnati,
Ohio, assignors to Kett Tool Co., Cincinnati, Ohio
Filed Sept. 17, 1968, Ser. No. 760,200
Int. Cl. F16l 9/12, 9/22
U.S. Cl. 138—178
4 Claims

ABSTRACT OF THE DISCLOSURE

A rubber band assembly for use in a machine for automatically wrapping a band around an article, the rubber band assembly comprising an elongated rubber tube which is slit transversely to define individual bands. The individual bands are temporarily attached to one another by two uncut hinge portions which controls pivotal movement of the endmost band as it is pivoted 90° in the automatic wrapping machine.

Also disclosed are an apparatus and method for forming the band assembly from an uncut tube. During the cutting operation, the tube is flattened and compressed by a platen which also carries a depending knife. The knife cooperates with a planar anvil provided with two spaced, longitudinal slots. A portion of the rubber tube is forced into each of the slots by the platen and remains uncut by the knife to form the two spaced interconnecting hinge portions between individual bands.

BACKGROUND OF THE INVENTION

This invention relates to elastic bands, such as rubber bands, and is particularly directed to an assembly of such bands for use in automatic wrapping equipment of the type adapted to snap a band around an article. The present invention is further directed to a novel method and apparatus for forming the present band assembly.

More particularly, it has been found desirable to provide machinery for wrapping articles, such as coiled newspapers and the like, with rubber bands. One machine of this type is disclosed in H. R. Hoffman et al. Pat. No. 3,186,333 and the method of wrapping articles with bands is disclosed and claimed in H. R. Hoffman et al. Pat. No. 3,393,633.

As disclosed in the Hoffman et al. patents, the band-applying machine is fed with a tubular stack of rubber bands. The stack is in the form of an elongated aggregation of bands which are defined by a plurality of transverse slits in the tube. The bands are substantially severed from one another, but are temporarily held together by a single uncut portion interconnecting adjacent bands.

In the operation of the apparatus, the stack of bands is held in a magazine. The lowermost band in the stack is then rotated 90° to bring it into position over four expander fingers. These expander fingers are then shifted in diverse directions to stretch the band into an enlarged quadrilateral, e.g. a trapezoidal configuration. During this operation, the band is torn from the remaining bands in the stack. After the band has been stretched, an article is inserted within the band and the band is forced from the fingers and snaps over the article to be wrapped.

While the apparatus and method of applying bands have provide to be quite satisfactory, the rubber band assembly disclosed in those patents has proved unsatisfactory. In the first place, the assembly is somewhat unwieldly to handle. It is difficult to load into the magazine properly and at times the bands inadvertently become torn from one another. Even more importantly, the bands have not operated reliably in the wrapping equipment. These difficulties increase greatly as the length of the rubber band increases.

SUMMARY OF THE INVENTION

Accordingly, it is the principal object of the present invention to provide a novel rubber band assembly which is easy to handle and to load into rubber band applying equipment and which operates extremely reliably in the equipment over a wide range of band sizes, for example, from one inch in length to four inches in length.

More particularly, the present improved rubber band assembly comprises a plurality of bands in tubular form, the tube having a generally oval configuration with two generally parallel planar sides interconnected by curved end portions. The individual bands are substantially separated from one another by a plurality of parallel spaced slits. However, each band is interconnected with the adjacent bands by two uncut, widely spaced hinge portions. In a preferred form of assembly, the hinge portions are disposed closely adjacent to the ends of one straight section of the band. Moreover, each hinge section is of a thickness less than the thickness of the band wall, i.e. the band-defining slit extends partially through the wall of the band in which the hinges are formed.

One of the advantages provided by the provision of two spaced hinges located as described, is that the hinges control the plane of rotation of the band so that every band is pivoted into the same correct position over all of the expander fingers. Thus, these fingers are able to firmly grip the band and carry it through the wrapping sequence.

It will be appreciated that if, as with prior art bands, a band is tilted in one direction or the other and does not properly engage all of the fingers, the band is not stretched properly by the fingers to receive the article to be wrapped. In the past, using the bands of the type shown in Pat. No. 3,186,333, an inordinately large number of bands were not pivoted in the right orientation so that the bands did not engage one or more of the fingers. As a result, the machine went through an entire cycle without wrapping an article. Since one of the principal advantages of a wrapping machine is its high speed, this lost time is objectionable indeed.

A still further advantage of the provision of the two-hinge connection described is that every band is separated cleanly from the remaining bands in the stack. The final tear line between bands extends generally parallel to the slit so that the bands are not weakened by irregular tears.

A still further advantage of the present band and the method of manufacture is that it provides means for accurately controlling the cross-sectional area of the hinges interconnecting adjacent bands. If these areas are too small, the bands do not retain their tubular shape for proper insertion into the magazine of the machine and the bands tend to tear apart in handling. On the other hand, if the hinge connections are too large, then an excessive amount of force is required to tear the bands and there is a tendency to pull the entire stack of bands through the machine when one band is being torn.

More specifically, in accordance with the present method, all portions of the slit are made by a single straight-edge knife blade. The blade is mounted upon a reciprocating platen. The uncut tube is disposed between the platen and a planar anvil. The anvil is provided with two slots spaced transversely of the plane of the knife. When the platen is advanced toward the anvil, it flattens the tube and compresses the tube so that a portion of the band is forced into each of the two slots. The knife blade is forced through the tube into engagement with the flat anvil face. Thus, the tube is completely slit in a transverse plane, except for the portions lying in the two slots. These portions are uncut and form the two hinge members. Because only a portion of the thickness of the band is forced into the slots by the anvil, the knife blade partially severs the band adjacent the hinge members from the inside surface of the band toward the exterior surface.

We have empirically determined that this method of cutting provides means for accurately controlling the cross-sectional area of the hinges. This cross-sectional area can be altered by varying the width of the slots.

These and other objects and advantages of the present invention will be more readily apparent from a consideration of the following detailed description of the drawings illustrating the rubber band stack of the present invention, the apparatus for producing the stack, and a portion of a wrapping machine in which the stack is used.

In the drawings:

FIG. 1 is a perspective view of a stack of rubber bands constructed in accordance with the present invention.

FIG. 2 is a transverse, cross-sectional view through a slit between the two adjacent bands taken along line 2—2 of FIG. 1.

FIG. 3 is a front elevational view of one form of apparatus for producing the present stack of rubber bands.

FIG. 4 is a cross-sectional view of the apparatus taken generally along line 4—4 of FIG. 3.

FIG. 5 is an enlarged, fragmentary cross-sectional view showing the knife performing a slit between adjacent bands, but leaving an uncut hinge section.

FIG. 6 is an end view of the apparatus with the stack of bands emerging from the cutting station.

FIG. 7 is a cross-sectional view taken along line 7—7 of FIG. 6.

FIG. 8 is a vertical cross-sectional view taken through a rubber band wrapping machine, showing the stack of bands in the machine magazine.

FIG. 9 is a cross-sectional view generally similar to FIG. 8 showing the manner in which the feeder blade of the machine pivots the lowermost band over the expender fingers.

A rubber band stack 10 of the present invention is best illustrated in FIGS. 1 and 2. This stack 10 is particularly intended for use in machines for automatically placing rubber bands over articles, such as rolled newspapers, wrapped items and the like. The details of construction of one such machine are disclosed in H. R. Hoffman et al. Pat. No. 3,186,333. This patent also discloses the method in which rubber bands are snapped over the item to be encircled. The details of this method are also disclosed and claimed in H. R. Hoffman et al. Pat. No. 3,393,633.

It is to be understood that the present stack of rubber bands is particularly adapted to be utilized in machines of the type disclosed in Pat. No. 3,186,333 and in modifications of that type of device. A portion of a band-applying machine of this type is illustrated in FIGS. 8 and 9 of the present application. Since the precise details of the rubber band stretching machine are not part of the present invention, the disclosures of U.S. Pat. 3,186,333 and 3,393,633 disclosing these details are incorporated by reference and one skilled in the art may refer to these patents for details of the apparatus not specifically disclosed in this application.

The present rubber band stack 10 constitutes a substantial improvement over the rubber band stack disclosed in Pat. No. 3,186,333 both from the point of view of ease of handling the stack during loading of the machine and from the point of view of reliability of operation of the machine, particularly with larger sized bands.

More particularly, as is shown in FIG. 1, the stack of rubber bands 10 comprises a generally tubular-shaped aggregation of a plurality of individual bands 11. The individual bands 11 are of generally oval configuration including two parallel, substantially straight portions 12 and 13, and two semi-circular end portions 14 and 15. Each rubber band 11 is substantially severed from the adjacent bands, but is joined to each adjacent band by two uncut bands or "hinge" portions 16 and 17.

The two hinge portions 16 and 17 are preferably disposed closely adjacent to the junctures of the rounded end portions 14 and 15 and straight portions 12 and 13. As is best shown in FIG. 2, the uncut bands, or hinge portions, extend from the outer surface 18 of the band only a fraction of the thickness of the band inwardly toward the inner surface 20. Viewed another way, the cuts 21 between adjacent bands extend completely through the bands except at the hinge portions. In the area of the hinge portions, the cuts 21 extend only for a fraction of the thickness of the band from the inside of the band toward the outer periphery thereof.

We have empirically determined that for "loaded" rubber bands having a flat, inside length of 1¼" and a .040" gage thickness, a desirable cross-sectional area of the hinge portions 16 and 17 is of the order of .005 sq. inch. The distance between the hinges, i.e. the length of cut segment 22 is approximately ¾". With bands joined by hinge sections of this dimension, the force required to separate adjacent bands is approximately one pound, i.e. one-half pound force is required to tear each band. We have empirically determined that this is an extremely satisfactory force level. Specifically, the force is high enough that the bands do not come apart during normal handling. At the same time, the force is low enough that the bands can be sequentially torn from the stack without causing a malfunction of the machine, for example, by causing the stack to be pulled from the magazine when one band is being torn.

One preferred form of apparatus for manufacturing the band assembly, or stack 10, is illustrated in FIGS. 3–7. This machine is adapted to operate on, as a starting material, an elongated rubber or synthetic elastic tube having the final configuration of the rubber band stack shown in FIG. 1, except for the fact that the tube 23 has no slits. The slitting apparatus 24 comprises an anvil 25 over which the tubular band is advanced lengthwise, the flat section 13 of the tubular band resting upon the anvil.

At least adjacent to the slitting station 26, the anvil 25 is preferably formed of material, such as hard aluminum or the like. This anvil portion is provided with a planar upper surface 27 and includes two parallel spaced slots 28 and 30 extending parallel to the length of the tube and parallel to its direction of advance through the machine. In the embodiment shown, the tube is positioned transversely with respect to slots 28 and 30 by longitudinal guide strips 31 and 32 mounted above anvil 25. An adjustable stop member 33 extends transversely of the tube for engagement with the end portion of the tube prior to the time the tube is compressed and flattened by the knife-carrying platen 34.

As best shown in FIGS. 3, 4 and 7, the stop member 33 is bolted on top of spaced mounting blocks 35 and 36 by means of bolts 37. As will be readily apparent to those skilled in the art, if desired, stop member 33 can be provided with longitudinal slots for receiving bolts 37 to provide for longitudinal adjustment of the stop for varying the width of the individual bands 11. Stop 33 is spaced from anvil 25 so that the tube, after it has been severed, can be discharged from the apparatus between the stop and anvil in the manner shown in FIGS. 3 and 6.

Platen 34 is mounted upon the lower end of a reciprocated member 38. The platen may be reciprocated vertically in any suitable manner, such as by means of a pneumatic piston, an eccentric driven by an electric motor, or the like. The platen 34 carries along its forward edge knife blade 40. Blade 40 extends below the platen a distance slightly less than twice the thickness of a wall of the rubber band. This knife blade is clamped in position by means of a bracket 41 bolted to the platen as by means of bolts 42. It is to be understood that the upward travel of the platen is sufficient for the lower edge 43 of the platen and knife to be disposed above the upper wall 12 of the tube in its uncompressed state so that the tube may be fed axially beneath the platen.

The downward travel of the platen is such that the lower face 43 of the platen engages the tube and flattens the tube as shown in FIG. 4. Additionally, the platen slightly compresses the two upper and lower walls 12 and 13 of the tube so that a portion identified by the numeral 44 of wall 13 is forced downwardly into each of the longitudinal slots 28. At the lower extremity of the platen stroke, the lower edge 45 of the knife blade just contacts the upper face 46 of the anvil 25. As a result, the knife blade passes completely through all portions of the rubber tube except for the portions 44 disposed in slots 28 and 30. These uncut portions 44 become the hinge or band portions 16 and 17.

It will be appreciated that the cross-sectional area of the hinge sections 16 and 17 can readily be controlled by varying the width of slots 28 and 30. We have found that the rubber band described above having hinges of .005 sq. inch in cross-sectional area can be formed by providing slots of approximately .016" in width.

In operation of the apparatus shown in FIGS. 3-7, the uncut tube is advanced against stop 33 while the platen 34 is in its uppermost position. The platen is then reciprocated downwardly to flatten and compress the tube while the knife 40 completely severs the tube to form slits 21 except for the portions 44 of the tube which have been forced into slots 28 and 30. After the cut has been made, the platen is raised and the tube is advanced by one band width until the tube again engages stop 33. Subsequently, the platen is again shifted downwardly to make the next slit 21.

It will, of course, be obvious to those skilled in the art that various modifications can be made in the forming machine. For example, it may include a platen carrying a plurality of parallel spaced knives 40. These knives would be spaced apart the desired width of the individual rubber bands and each knife blade would overlie two spaced slots 28 and 30.

The manner in which the present rubber bands are utilized is illustrated in FIGS. 8 and 9 which show a portion of the rubber band stretching machine which is more fully illustrated in Pat. No. 3,186,333. It is to be understood that the parts of the machine not shown in FIGS. 8 and 9 are like that shown in Pat. No. 3,186,333 and that the machine operates in the same way. More particularly, the portion of the rubber band stretching machine 50 shown in FIGS. 8 and 9 includes a vertical magazine 51 for supporting a stack 10 of rubber bands. The individual rubber bands 11 are oriented in a generally horizontal plane with the hinge-carrying wall 13 of the tube being in abutment with rear wall 52 of the magazine. The bottom edge of the lowermost band 11 rests upon a shelf member 53.

The stretching machine further comprises four fingers 54 which are adapted to be inserted within a rubber band and are then shifted in divergent paths until the fingers form the corners of an enlarged quadrilateral. As the fingers are shifted, they stretch the rubber band to tear the lowermost rubber band from the remaining bands in the stack. The stretched rubber band is held by the fingers in position so that the band has a large central opening which is larger than the article to be wrapped. While the band is so positioned, the article to be wrapped is placed within the confines of the band and the band is slipped off the fingers to snap around the article.

FIG. 9 illustrates the manner in which the lowermost band 11 is shifted over the fingers 54. As is there shown, straight wall 12 of the lowermost band 11 is contacted by a feeder blade 55. This feeder blade is carried by two depending arms 56 which are pivotally mounted upon a shaft 57. In its initial, or retracted, position, as shown in FIG. 8, the feeder blade is displaced outwardly from the stack of bands 10. When the feeder blade is advanced, however, it pushes against wall 12 of the lowermost band 10 and causes that band to pivot clockwise about the two hinge portions 16 and 17. These two spaced hinge portions 16 and 17 assure that the plane of the lowermost band 11 remains substantially normal to the axis of fingers 54 and that the band does not tilt. Consequently, the band fits completely over all of the fingers and does not become hung up on one or more of the fingers. Thereafter, when the fingers are spread apart they firmly grip the inner surface of the band to carry it through the wrapping cycle. As the fingers are spread, the stack of bands 10 is restrained by the magazine walls and blade 55. The lowermost band 11 is stretched by fingers 54 and torn from the next adjacent band. The partial severing of the hinges facilitates the smooth tearing of the band so that no irregular tears are formed between adjacent bands which would have the effect of weakening whichever band is torn.

From the foregoing disclosure of the general principles of the present invention and the above description of a preferred embodiment, those skilled in the art will readily comprehend many modifications to which the present invention is susceptible. For example, while the specific rubber band stack disclosed is provided with two hinges, it is contemplated that, particularly for larger sized bands, it may be found desirable to utilize three or perhaps more hinges. Accordingly, we desire to be limited only by the scope of the following claims.

Having described our invention, we claim:

1. As a new article of manufacture, a rubber band stack tube comprising a plurality of individual interconnected bands for use in a wrapping machine in which the individual bands are sequentially rotated 90° in a plane of rotation perpendicular to the axis of said tube and torn from the stack, each band when torn from the stack being in the form of a single uncut continuous band, said stack comprising a tube of generally oval configuration, said tube including first and second spaced long sides, said long sides being interconnected by short arcuate sides, a plurality of parallel spaced slits extending perpendicular to the length of said tube, each slit extending completely through said first long side, through the center section of the second long side, and through at least a portion of each of said arcuate sides, said slits defining a plurality of individual bands, each of said bands being interconnected to the adjacent band only by two spaced uncut hinge portions in the second long side of said tube whereby the two hinges control the plane of rotation of each band to ensure that every band is pivoted and rotated in said plane of rotation to the correct position in said wrapping machine.

2. The rubber band stack of claim 1 in which said hinge portions are formed adjacent to the ends of said second straight portion.

3. The rubber band stack of claim 1 in which said hinge portions are of a thickness less than the thickness of said rubber bands.

4. The rubber band stack of claim 2 in which said hinge portions are of a thickness less than the thickness of said rubber bands.

References Cited

UNITED STATES PATENTS

| | | | |
|---|---|---|---|
| 308,942 | 12/1884 | Yewell | 206 Rubber Band Dig. |
| 1,886,842 | 11/1932 | Shaw | 206 Rubber Band Dig. |
| 1,949,465 | 3/1934 | Gammeter | 264—159 |
| 3,186,333 | 6/1965 | Hoffman et al. | 100—9 |

FOREIGN PATENTS

| | | |
|---|---|---|
| 905,110 | 2/1954 | Germany 206 Rubber Band Dig. |

HERBERT F. ROSS, Primary Examiner

U.S. Cl. X.R.

100—9; 138—177; 264—159